US012197276B2

(12) United States Patent
Tsirkin (10) Patent No.: US 12,197,276 B2
(45) Date of Patent: Jan. 14, 2025

(54) MEMORY PAGE FAULT HANDLING FOR NETWORK INTERFACE DEVICES IN A VIRTUALIZED ENVIRONMENT

(71) Applicant: RED HAT, INC., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 92 days.

(21) Appl. No.: 17/864,001

(22) Filed: Jul. 13, 2022

(65) Prior Publication Data
US 2022/0350694 A1 Nov. 3, 2022

Related U.S. Application Data

(63) Continuation-in-part of application No. 16/862,466, filed on Apr. 29, 2020, now Pat. No. 11,392,504.

(51) Int. Cl.
*G06F 11/07* (2006.01)

(52) U.S. Cl.
CPC ........ *G06F 11/0793* (2013.01); *G06F 11/073* (2013.01); *G06F 11/0787* (2013.01)

(58) Field of Classification Search
CPC ............... G06F 11/0793; G06F 11/073; G06F 11/0787; G06F 11/0712
See application file for complete search history.

(56) References Cited

U.S. PATENT DOCUMENTS

| | | |
|---|---|---|
| 6,532,525 B1 | 3/2003 | Aleksic et al. |
| 7,912,060 B1 * | 3/2011 | Chen ...................... H04L 47/27 370/231 |
| 8,255,475 B2 | 8/2012 | Kagan et al. |
| 8,307,191 B1 | 11/2012 | Jain |
| 8,402,172 B2 | 3/2013 | Muppirala et al. |
| 8,745,276 B2 | 6/2014 | Bloch et al. |
| 8,875,162 B2 | 10/2014 | Agesen et al. |
| 9,003,171 B2 | 4/2015 | Gonion |
| 9,058,183 B2 | 6/2015 | Woller et al. |

(Continued)

OTHER PUBLICATIONS

Ilya Lesokhin et al., "Page Fault Support for Network Controllers", https://courses.engr.illinois.edu/ece598ms/sp2018/papers/paper254.pdf, Technion—Israel Institute of Technology; Mellanox Technologies; VMware Research, Apr. 8-12, 2017, 18 pgs.

(Continued)

*Primary Examiner* — Sean D Rossiter
(74) *Attorney, Agent, or Firm* — Dority & Manning, P.A.

(57) ABSTRACT

Systems and methods for supporting memory page fault handling for network devices are disclosed. In one implementation, a processing device may receive, at a network interface device of a host computer system, an incoming packet from a network. The processing device may also select a first buffer from a plurality of buffers associated with a receiving queue of the network interface device. The processing device may attempt to store the incoming packet at the first buffer of the plurality of buffers. Responsive to receiving a notification that attempting to store the incoming packet at the first buffer encountered a page fault, the processing device may assign the first buffer to a wait queue of the network interface device. The processing device may further store the incoming packet at a second buffer of the plurality of buffers associated with the receiving queue.

17 Claims, 5 Drawing Sheets

(56) References Cited

U.S. PATENT DOCUMENTS

| | | | |
|---|---|---|---|
| 9,201,793 | B2 | 12/2015 | Schneider |
| 9,280,380 | B2 | 3/2016 | Tsirkin |
| 9,535,855 | B2 | 1/2017 | Epstein |
| 10,031,856 | B2 | 7/2018 | Duluk, Jr. et al. |
| 10,826,649 | B1* | 11/2020 | Yu .................. H04L 1/0058 |
| 11,074,206 | B1 | 7/2021 | Jalal et al. |
| 11,500,668 | B2* | 11/2022 | Tsirkin ............... G06F 9/45558 |
| 2011/0161620 | A1 | 6/2011 | Kaminski et al. |
| 2014/0089450 | A1 | 3/2014 | Raindel et al. |
| 2014/0281056 | A1* | 9/2014 | Davda ............... G06F 12/1027 710/26 |
| 2014/0310405 | A1* | 10/2014 | Pope ................ G06Q 40/04 709/224 |
| 2015/0212956 | A1 | 7/2015 | Tsirkin et al. |
| 2015/0309839 | A1 | 10/2015 | Lu |
| 2016/0077946 | A1 | 3/2016 | Raikin et al. |
| 2017/0052916 | A1 | 2/2017 | Kollu |
| 2017/0093677 | A1* | 3/2017 | Skerry ................. H04L 43/20 |
| 2017/0329655 | A1 | 11/2017 | Yuan et al. |
| 2018/0131466 | A1* | 5/2018 | DiMattia ............. H04L 65/611 |
| 2019/0034208 | A1 | 1/2019 | Comparan et al. |
| 2020/0004703 | A1 | 1/2020 | Sankaran et al. |
| 2020/0050557 | A1 | 2/2020 | Wu et al. |
| 2020/0059421 | A1* | 2/2020 | Wang ................. H04L 49/70 |
| 2020/0117605 | A1* | 4/2020 | Cornett ............ H04L 49/9047 |
| 2020/0125518 | A1 | 4/2020 | Ringe et al. |
| 2020/0142699 | A1 | 5/2020 | Brown et al. |
| 2020/0310993 | A1 | 10/2020 | Kumar et al. |
| 2021/0342272 | A1 | 11/2021 | Tsirkin |
| 2021/0365328 | A1* | 11/2021 | Zimring ................ F16L 55/48 |
| 2022/0138071 | A1 | 5/2022 | Edara et al. |

OTHER PUBLICATIONS

Network Data Buffer Management, Microsoft, https://docs.microsoft.com/en-us/windows-hardware/drivers/netcx/network-data-buffer-management, Feb. 20, 2018, 4 pgs.

Dan Siemon, "Queueing in the Linux Network Stack", Linux Journal, LLC, https://www.linuxjournal.com/content/queueing-linux-network-stack, Sep. 23, 2013, 11 pgs.

Stephane Eranian et al., "Virtual Memory in the IA-64 Linux Kernel", https://www.informit.com/articles/article.aspx?p=29961&seqNum=5, Informit, Nov. 8, 2002, 35 pgs.

Ilya Lesokhin, "I/O Page Faults", http://www.cs.technion.ac.il/users/wwwb/cgi-bin/tr-get.cgi/2015/MSC/MSC-2015-21.pdf, Technion—Israel Institute of Technology; Computer Science Department, Nov. 2015, 85 pgs.

Jan Christoph Nordholz, "Efficient Virtualization on Hardware with Limited Virtualization Support", https://www.sti.tu-berlin.de/fileadmin/fg214/finished_theses/Nordholz/diplom_nordholz.pdf, Technical University Berlin Institute for Software Technology and Theoretical Computer Science, May 2, 2011, 70 pgs.

Herrmann J., et al., "Virtualization Tuning and Optimization Guide," Red Hat Customer Content Services, 2020, 50 Pages, Retrieved from URL: https://access.redhat.com/documentation/en-us/red_hat_enterprise_linux/6/html-single//irtualization_tuning_and_optimization_guide/index.

Oasis: "Virtual I/O Device (VIRTIO) Version 1.1," Committee Specification Draft 01, Dec. 20, 2018, 132 Pages, Retrieved from URL: https://docs.oasis-open.org/virtio/virtio/v1.1/csprd01/virtio-v1.1-csprd01.html.

Sembrant A., "Hiding and Reducing Memory Latency—Energy-Efficient Pipeline and Memory System Techniques," Uppsala University, 2016, 86 Pages, Retrieved from URL: https://uu.diva-portal.org/smash/get/diva2:1040387/FULLTEXT01.pdf.

* cited by examiner

MEMORY PAGE FAULT HANDLING FOR NETWORK INTERFACE DEVICES IN A VIRTUALIZED ENVIRONMENT

CROSS-REFERENCE TO RELATED APPLICATIONS

This application is a continuation-in-part of U.S. patent application Ser. No. 16/862,466, filed on Apr. 29, 2020 and entitled "Memory Page Fault Handling Network Interface Devices In A Virtualized Environment," the entire contents of which is incorporated herein by reference

TECHNICAL FIELD

The disclosure is generally related to virtualization systems, and is more specifically related to memory page fault handling for network interface devices in a virtualized environment.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. To communicate over a network, a virtual machine may include a network device driver to receive and transmit data to and from the network using one or more network devices.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure are directed to supporting page fault handling for network interface devices in a virtualized environment.

Certain processor architectures support virtualization by providing special instructions for facilitating virtual machine execution. In certain implementations, a processor may support executing a hypervisor that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. Further, virtual machines can include network interface device drivers to communicate with network interface devices of the host system.

Advanced memory management techniques at a host system, including memory deduplication, memory swap for an over-committed processor of the host system, non-uniform memory access (NUMA), etc., may require the handling of page fault errors in order to enable the detect and address a situation where a memory page is not currently present. It is particularly important for a virtual machine to be able to handle page faults, in order to be able to efficiently support memory migration of the virtual machine. However, page fault handling is not fully supported for network interface devices (e.g., Network Interface Cards "NICs"). As an example, it is particularly challenging to pause the processing of incoming packets from a network to the network interface device until an encountered page fault is handled. The network interface device may not be able to inform the sender or senders of the packets to stop sending packets to the network interface device until the page fault is handled. Therefore, pausing the processing of the incoming packets when the sender continues to send packets may result in buffer overrun and potential loss of some incoming packets. Therefore, conventional systems do not support page fault handling for incoming packets of network interface devices.

In some implementations, page fault handling can be supported for outgoing packets from the network interface device to the network. In this case, an outgoing packet can be stored at a memory buffer of an outgoing queue of the network interface device driver. If the outgoing packet triggers a page fault in one of the memory buffers of the outgoing queue, due to memory page of the memory buffer not being present in the physical memory, the network interface device can trigger a page fault and can pause transmission of packets until the page fault is handled. This approach, however, may not work with incoming packets arriving at the network interface device. As explained above, the network interface device may not be able to communicate with potential senders of incoming packets to pause sending of packets until a page fault is handled. Therefore, conventional systems may not be able to support page fault handling for memory buffers of the incoming queue of network interface devices.

Aspects of the disclosure address the above and other deficiencies by providing techniques for supporting memory page fault handling in network interface devices of a host computer system by enabling the network interface devices to process memory buffers of an incoming queue in an order that may be different than the order in which the buffers became available to the network interface device. In accordance with aspects of the present disclosure, a network interface device of a host computer system may receive incoming packets from a network, e.g., to be consumed by a process running in a virtual machine of the host system. A network interface device of the host computer can transmit and receive packets of data between the host system and a network. An example of a network interface device is a Network Interface Card (NIC) of a host computer system.

In one implementation, a driver of the network interface device may be running as part of a guest operating system of the virtual machine. A network interface device driver refers to a software component that enables the network interface device to communicate with the operating system, with the network, as well as with other network interface devices. The network interface device driver can allocate a receiving queue that has a set of memory buffers for storing incoming packets from the network, to be processed by the network interface device, and a wait queue where memory buffers that generate a page fault error can be stored until the page fault error is handled, as explained in more details below. In certain implementations, when the device driver allocated the memory buffers of the receiving queue, the device driver can mark the memory buffers as available, indicating to the network interface device that the buffers can be used for storing packets from the network.

In another implementation, the network interface device may allocate in a memory residing in the network interface device the receiving queue that has a set of memory buffers for storing incoming packets from the network, to be processed, and a wait queue where memory buffers that generate an error (e.g., a page fault error) can be stored until the page fault error is handled. Accordingly, when the network interface device allocated the memory buffers of the receiving queue, the network interface device can mark the memory buffers as available, indicating to the network interface device that the buffers can be used for storing packets from the network.

In another implementation, a hypervisor running on the host computer system may allocate the receiving queue that has a set of memory buffers for storing incoming packets from the network, to be processed, and a wait queue where memory buffers that generate an error (e.g., a page fault error) can be stored until the page fault error is handled. Accordingly, when the hypervisor allocated the memory buffers of the receiving queue, the hypervisor can mark the memory buffers as available, indicating to the network interface device that the buffers can be used for storing packets from the network.

In yet another implementation, a guest operating system of a virtual machine (VM) running on the host computer system may allocate the receiving queue that has a set of memory buffers for storing incoming packets from the network, to be processed, and a wait queue where memory buffers that generate an error (e.g., a page fault error) can be stored until the page fault error is handled. Accordingly, when the guest operating system hypervisor allocated the memory buffers of the receiving queue, the guest operating system can mark the memory buffers as available, indicating to the network interface device that the buffers can be used for storing packets from the network.

When an incoming packet is received at the network interface device, the network interface device may select a buffer from the set of buffers of the receiving queue, for storing the incoming packet. In certain implementations, the selected buffer can be any of the buffers allocated by the device driver regardless of any specific order. In certain implementations, the selected buffer can be any of the buffers allocated by the network interface device regardless of any specific order. In certain implementations, the selected buffer can be any of the buffers allocated by the hypervisor regardless of any specific order. In certain implementations, the selected buffer can be any of the buffers allocated by the guest operating system regardless of any specific order. After selecting a buffer, the network interface device may attempt to store the incoming packet at the selected buffer. If the network interface device receives a notification that the operation to store the packet at the selected buffer has triggered a page fault, the network interface device may determine that the memory page containing the selected buffer is not currently present, for example due to the memory page being moved to a different storage device, different region of memory, etc. In this case, the network interface device may determine that the selected buffer can be moved to a wait queue until the page fault is handled. The network interface device may then attempt to store the incoming packet at another memory buffer of the set of memory buffers available at the receiving queue. For example, the network interface device may continue to attempt to store the incoming packet at another memory buffer until the store operation is performed at one of the memory buffers without triggering a page fault.

In certain implementations, when the incoming packet is stored at a memory buffer of the receiving queue, the network interface device may mark the memory buffer as used, indicating to the device driver that the packet stored at the memory buffer may be consumed. In certain implementations, when the incoming packet is stored at a memory buffer of the receiving queue, the network interface device may mark the memory buffer as used, indicating to the network interface device that the packet stored at the memory buffer may be consumed. In certain implementations, when the incoming packet is stored at a memory buffer of the receiving queue, the network interface device may mark the memory buffer as used, indicating to the hypervisor that the packet stored at the memory buffer may be consumed. In certain implementations, when the incoming packet is stored at a memory buffer of the receiving queue, the network interface device may mark the memory buffer as used, indicating to the guest operating system that the packet stored at the memory buffer may be consumed. When the network interface device detects that the packet stored at the memory buffer has been consumed (i.e., the content of the memory buffer has been read by an application), the network interface device may mark the memory buffer as available, thus enabling the memory buffer to be used for storing another incoming packet, and so on. In one implementation, the receiving queue may be a bi-directional queue that may carry both available and used memory buffers. In another implementation, the used buffers may be moved to a different queue, keeping the receiving queue for storing the available memory buffers only.

In an implementation, when the page fault of the memory buffer that is assigned to the wait queue is handled, the network interface device may determine that the memory page containing the memory buffer is currently present and that the memory buffer may be used for storing incoming packets. As an example, the network interface device may run a background thread to monitor the status of the page fault of the memory buffers assigned to the wait queue, and to detect when a page fault of one of the memory buffers is handled. The background thread may then notify the network interface device that a page fault has been successfully handled (i.e., the memory page that triggered the page fault has been copied from a backing store to a physical memory). When the network interface device is notified that a page fault has been handled, the network interface device may remove the memory buffer associated with the completed page fault from the wait queue and may mark the memory buffer as available. In an implementation, the network interface device may also store an incoming packet to the memory buffer and assign the memory buffer to the receiving queue, such that the stored packet can be consumed using the device driver. In another implementation, the network interface device may also store an incoming packet to the memory buffer and assign the memory buffer to the receiving queue, such that the stored packet can be consumed using the network interface device. In another implementation, the network interface device may also store an incoming packet to the memory buffer and assign the memory buffer to the receiving queue, such that the stored packet can be consumed using the hypervisor. In another implementation, the network interface device may also store an incoming packet to the memory buffer and assign the memory buffer to the receiving queue, such that the stored packet can be consumed using the guest operating system.

In an implementation, note that in consuming the packets stored at the memory buffer, the network interface device driver is also configured to consume the packets from memory buffers that may be in a different order than the order in which the memory buffers were allocated by the network interface device driver. In another implementation, in consuming the packets stored at the memory buffer, the network interface device may be configured to consume the packets from memory buffers that may be in a different order than the order in which the memory buffers were allocated by the memory buffer, the network interface device, the hypervisor, or the guest operating system. In another implementation, in consuming the packets stored at the memory buffer, the hypervisor may be configured to consume the packets from memory buffers that may be in a different order than the order in which the memory buffers were allocated by the memory buffer, the hypervisor. In another implementation, in consuming the packets stored at the memory buffer, the guest operating system may be configured to consume the packets from memory buffers that may be in a different order than the order in which the memory buffers were allocated by the memory buffer, the guest operating system.

Thus, implementations of the disclosure enables the efficient handling of page faults when storing incoming packets at a receiving queue of a network interface device, without compromising the performance of the network interface device. By enabling the network interface device (e.g., NIC) to use memory buffers in an order that may be different than the order in which the memory buffers were allocated (i.e., because memory buffers that generate a page fault can be skipped), the network interface device is able to make progress in storing and consuming incoming packets in an efficient way. The overhead of handling the page fault is minimized because the network interface device can proceed to use another memory buffer to store the incoming packet without having to wait for the page fault of the first memory buffer to be handled. Additionally, the incoming packets that are received at the network interface device are consumed in the same order in which they were received at the network interface device. Therefore, the processing of the incoming packets continues to be handled in a fair way despite the handling of page faults of certain memory buffers by the network interface device.

Depending on the implementation, the network interface device may be replaced with any networking device (e.g., a network attached storage device, an input device or etc.) and packet may be any data received by the networking device such as a networking packet, a storage request, an input event etc.

Figure 1:
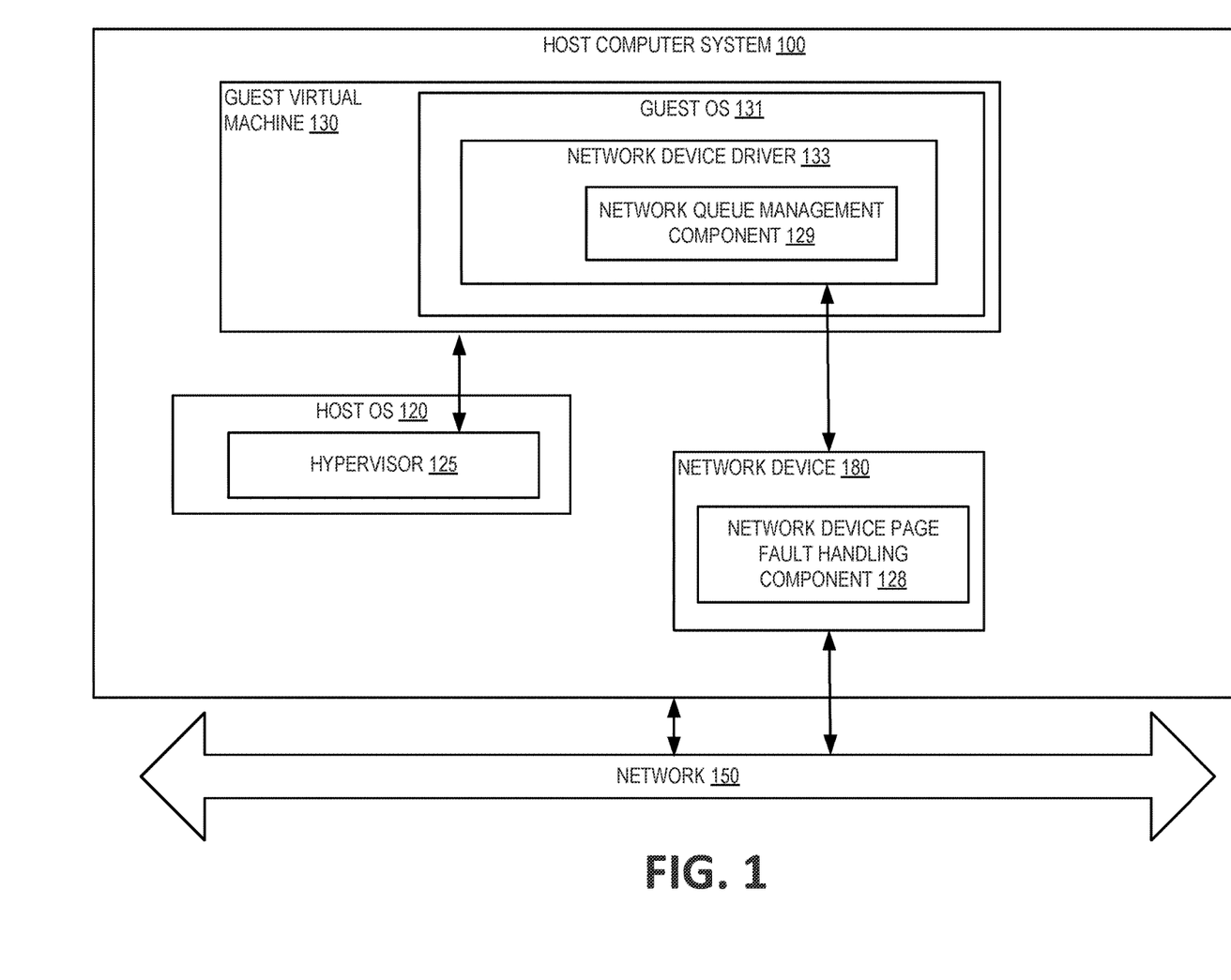
FIG. 1 depicts a high-level diagram of an example system architecture operating in accordance with one or more aspects of the disclosure.

FIG. 1 depicts an illustrative architecture of elements of a host computer system 100 (hereinafter "host system 100"), in accordance with an embodiment of the present disclosure. It should be noted that other architectures for host system 100 are possible, and that the implementation of a computer system utilizing embodiments of the disclosure are not necessarily limited to the specific architecture depicted by FIG. 1. Host system 100 may comprise one or more processors communicatively coupled to memory devices and input/output (I/O) devices. Host system 100 runs a host operating system (OS) 120, which can comprise software that manages the hardware resources of the computer system and that provides functions such as inter-process communication, scheduling, virtual memory management, and so forth. In some examples, host operating system 120 also comprises a hypervisor 125, which provides a virtual operating platform for guest virtual machine (VM) 130 and manages its execution, e.g., by abstracting the physical layer, including processors, memory, and I/O devices, and presenting this abstraction to the VM as virtual devices. VM 130 can be software implementation of a machine that executes programs as though it were an actual physical machine. Although, for simplicity, a single VM is depicted in FIG. 1, in some other embodiments host system 100 can comprise a plurality of VMs.

VM 130 can have a corresponding guest operating system 131 that manages virtual machine resources and provides functions such as inter-process communication, scheduling, memory management, and so forth. Guest operating system 131 may run network interface device driver 133. Network interface device driver 133 may be a software component that enables network interface device 180 to communicate with guest operating system 131, as well as with other network interface devices. Network interface device driver 133 can include network queue management component 129 that may facilitate page fault handling for network interface devices within host system 100. Network queue management component 129 can allocate a set of memory buffers within a receiving queue for storing incoming packets from network 150. Network queue management component 129 can also allocate a wait queue where memory buffers that generate a page fault can be stored until the page fault is handled. In certain implementations, when the memory buffers of the receiving queue are allocated, network queue management component 129 can mark each of the memory buffers as available, so that it may be used for storing packets from network 150.

As shown in FIG. 1, the host system 100 is connected to a network 150. The host system 100 can be a server, a mainframe, a workstation, a personal computer (PC), a mobile phone, a palm-sized computing device, etc. The network 150 can be a private network (e.g., a local area network (LAN), a wide area network (WAN), intranet, etc.)

or a public network (e.g., the Internet). Host system 100 may also include network interface device 180. Network interface device 180 may be internet protocol (IP) interfaces, bridge interfaces, virtual local area network (VLAN) interfaces, network interface cards (NICs) bonds, or NICs. Network interface device 180 may communicate directly with network 150. Although, for simplicity, a single network interface device is depicted in FIG. 1, in some other embodiments host system 100 can comprise a plurality of network interface devices. As shown, network interface device 180 can include network interface device page fault handling component 128 that may facilitate handling of memory page faults in network interface devices.

In certain implementations, page fault handling component 128 may receive an incoming packet from network 150, e.g., to be consumed by a process running on VM 130. Page fault handling component 128 may then select a buffer from a set of buffers of a receiving queue that is allocated by network queue management component 129 of network interface device driver 133. Alternatively, the network queue management component 129 may reside wholly, or in part, in the hypervisor 125, the guest OS 131, or the network device 180. Accordingly, the set of buffers of the receiving queue is allocated by one of: the hypervisor 125, the guest OS 131, or the network device 180. The selected buffer can be used for storing the incoming packet, and can be any of the buffers allocated by network queue management component 129, regardless of any specific order. Page fault handling component 128 may then attempt to store the incoming packet at the selected buffer. If page fault handling component 128 receives a notification that storing the packet at the selected buffer generated a page fault, page fault handling component 128 may determine that the memory page containing the selected buffer is not currently present, and may determine that the selected buffer can be assigned to a wait queue until the page fault is handled. Page fault handling component 128 may attempt to store the incoming packet at another memory buffer of the set of memory buffers allocated by network queue management component 129. Upon successful storing of the packet at the other memory buffer, page fault handling component 128 may mark the buffer as used, so that the packet may be consumed by a process of VM 130. When page fault handling component 128 detects that the packet stored at the memory buffer has been consumed, page fault handling component 128 may mark the memory buffer as available, thus enabling the memory buffer to be used for storing another incoming packet.

In an implementation, in order to detect when the page fault has been handled, network queue management component 129 may run a background thread to monitor the status of the page fault of the memory buffers assigned to the wait queue, and to detect when a page fault of one of the memory buffers is handled. The background thread may then notify page fault handling component 128 that a page fault is handled. When notified, page fault handling component 128 may remove the memory buffer associated with the handled page fault from the wait queue and may mark the memory buffer as available, such that the memory buffer can be used for storing a next incoming packet. Page fault handling component 128 may then store an incoming packet to the memory buffer and assign the memory buffer to the receiving queue. The packet stored at the memory buffer may then be consumed by a process running on VM 130 based on the order in which the packet was received at network interface device 180.

Figure 2:
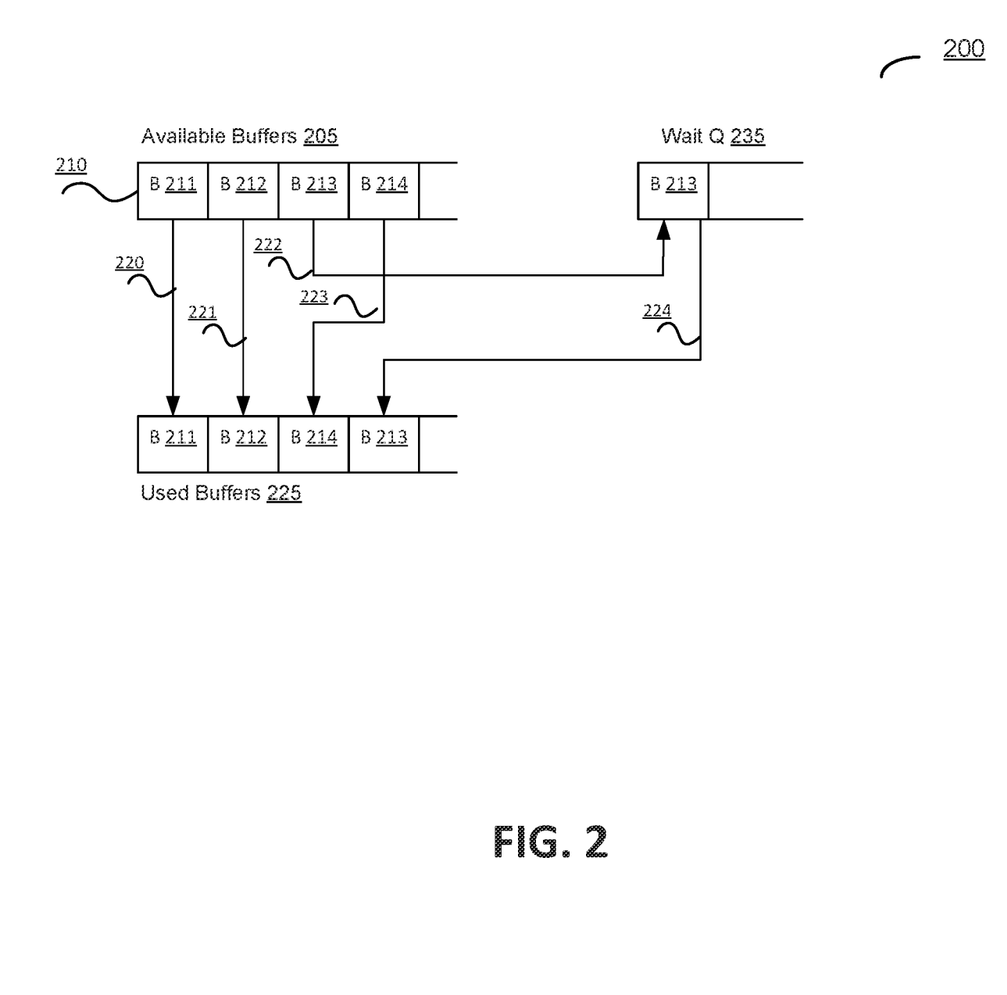
FIG. 2 depicts a block diagram of a method illustrating handling page fault errors in memory buffers when storing incoming packets of network devices, in accordance with one or more aspects of the present disclosure.

FIG. 2 depicts a block diagram of a method 200 illustrating handling page faults in memory buffers when storing incoming packets of network interface devices, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., host computer system 100 of FIG. 1) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

At operation 210, a network interface device driver allocates memory buffers B 211-214 and provides the allocated buffers as available buffers 205 to a processing logic of a network interface device to store incoming packets from into buffers B 211-214. Alternatively, the network interface device, a hypervisor, and/or a guest operating system may allocate memory buffer B 211-214 and provides the allocated buffers as available buffers 205 to a processing logic of a network interface device to store incoming packets from into buffers B 211-214.

At operation 220, the processing logic may receive a first incoming packet from the network and may select B 211 to store the first incoming packet so that it may be consumed by a process using the network interface device driver. Alternatively, the processing logic may receive the first incoming packet from the network and may select B 211 to store the first incoming packet so that it may be consumed by a process using the component (e.g., the network interface device, the hypervisor, and/or the guest operating system) which allocated the memory buffers. When the incoming packet is stored successfully at buffer B 211, the processing logic may mark B 211 as used and may assigned it a set of used buffers 225.

In certain implementations, available buffers 205 and used buffers 225 may be allocated within the same receiving queue of the network interface device driver (i.e., the receiving queue is a bi-directional queue that can host used as well as available memory buffers). Alternatively, available buffers 205 and used buffers 225 may be allocated within the same receiving queue of the network interface device, the hypervisor, and/or the guest operating system.

In other implementations, available buffers 205 may be allocated within a receiving queue and used buffers 225 may be allocated within a separate queue that can be dedicated to used buffer that are ready to be consumed by the network interface device driver. Alternatively, available buffers 205 may be allocated within a receiving queue and used buffers 225 may be allocated within a separate queue that can be dedicated to used buffer that are ready to be consumed by the network interface device, the hypervisor, and/or the guest operating system.

At operation 221, the processing logic may receive a second incoming packet from the network and may select B 212 to store the second incoming packet. Similar to B 211, when the incoming packet is stored successfully at buffer B 212, the processing logic may mark B 212 as used and may assigned it a set of used buffers 225. When the processing logic receives a third incoming packet, at operation 222, the processing logic may select B 213, and may attempt to store the third incoming packet at buffer B 213. The processing logic may then detect the occurrence of a page fault, indicating that the store operation failed because the memory page containing buffer B 213 currently is not present. Consequently, the processing logic may assign buffer B 213 to wait queue 235, such that buffer B 213 may be in a wait state until the page fault is handled. Buffer 213 may not be used by the processing logic for storing further packets while assigned to wait queue 235.

At operation 223, responsive to failing to store the third incoming packet at buffer B 213, the processing logic may attempt to store the third incoming packet at buffer B 214. When the third incoming packet is stored successfully at buffer B 214, the processing logic may mark B 214 as used and may assigned it a set of used buffers 225. Note that, while the used memory buffers 225 may not be in the same order that the memory buffers were made available in available buffers 205, the received incoming packets are ordered within used buffers 225 in the same order in which they were received at the processing logic, thus the consumption of the incoming packets can be handled in a fair and efficient way despite the handling of the page fault that may be encountered while accessing the memory buffers.

At operation 224, the processing logic may detect that the page fault has been handled, indicating that the memory page containing buffer B 213 is currently present in the system. The processing logic may determine that buffer B 213 can be used for storing incoming packets. The processing logic may then remove the memory buffer B 213 from wait queue 235 and may mark buffer B 213 as available. The processing logic may also store a fourth incoming packet to buffer B 213 and may assign buffer B 231 to used buffers 225, such that the fourth packet can be consumed using the network interface device driver.

Figure 3:
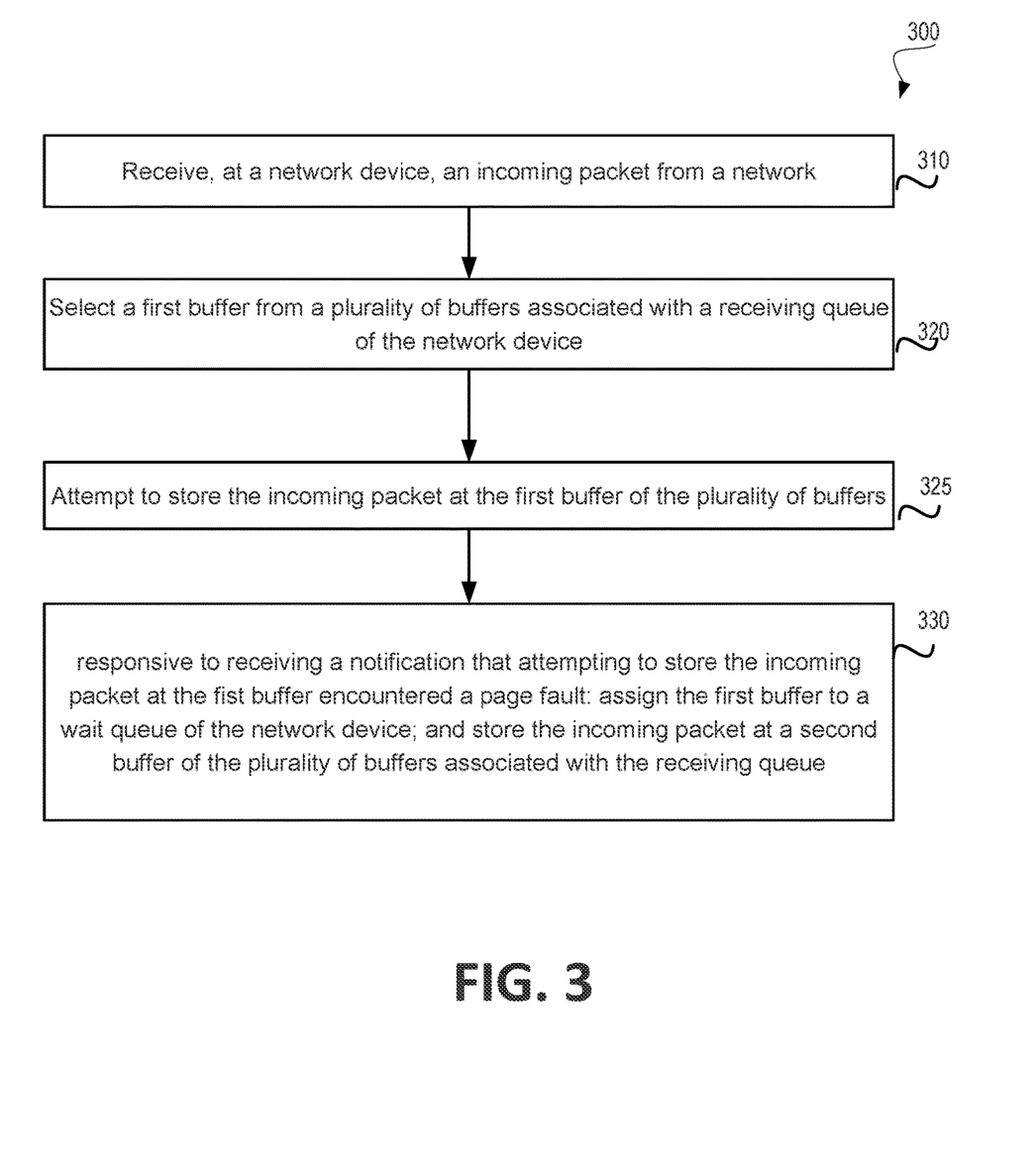
FIG. 3 is a flow diagram of an example method of supporting memory page fault handling for network devices in a virtualized system, in accordance with one or more aspects of the present disclosure.

FIG. 3 is a flow diagram of an example method of supporting memory page fault handling for network interface devices in a virtualized system, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the host computer system 100 of FIG. 1) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Method 300 may begin at block 310. At block 310, the processing logic may receive, at a network interface device of a host machine, an incoming packet from a network. In implementation, the network interface device may be a Network Interface Card (NIC) that may communicate with a virtual machine (VM), using a network interface device driver, for consuming the incoming packet, as described in more detail herein above.

At block 320, the processing logic may select a buffer from a set of buffers that are allocated by the network interface device driver and that are made available to the processing logic in a receiving queue of the network interface device driver. In one implementation, the selected memory buffer may be any of the buffers that are marked as available in the receiving queue, despite the order in which the buffers were allocated, as explained in more details herein.

At block 325, the processing logic attempts to store the incoming packet at the selected buffer. At operation 330, the processing logic may receive a notification that attempting to store the incoming packet at the selected buffer has encountered a page fault. In one implementation, the page fault may be generated because the memory page containing the selected memory buffer is currently not present at the expected memory address. Consequently, the processing logic may assign the selected buffer to a wait queue of the network interface device, until the page fault is handled. The processing logic may further store the incoming packet at another buffer from the set of buffers associated with the receiving queue, as explained in more details herein above.

In some implementations, the processing logic receives, by the network interface device of the host computer system, an incoming packet from the network. The processing logic selects a first buffer from the plurality of buffers associated with a receiving queue of the network interface. The plurality of buffers may be allocated by a driver of the network interface device, the network interface device in a memory residing in the network interface device, a hypervisor running on the host computer system, or a guest operating system of a virtual machine running on the host computer system. As described previously, the selected memory buffer may be any of the buffers that are marked as available in the receiving queue, despite the order in which the buffers were allocated, as explained in more details herein.

The processing logic attempts to store the incoming packet at the first buffer of the plurality of buffers. Responsive to detecting an error while attempting to store the incoming packet at the first buffer, the processing logic stores the incoming packet at a second buffer of the plurality of buffers associated with the receiving queue. Consequently, the processing logic may assign the first buffer to a wait queue, until the page fault is handled. Depending on the implementation, the processing logic marks the second buffer as used and responsive to detecting that the incoming packet at the second buffer has been read by the network interface device, the processing logic marks the second buffer as available. The error is represented by a page fault generated responsive to a memory page of the first buffer being not present in a physical memory of the host computer system.

In some implementation, responsive to handling of the page fault having been completed, the processing logic detects that the memory page of the first buffer is present. Responsive to detecting that the page fault is handled, the processing logic stores a second incoming packet at the first buffer and assigns the first buffer to the receiving queue.

Figure 4:
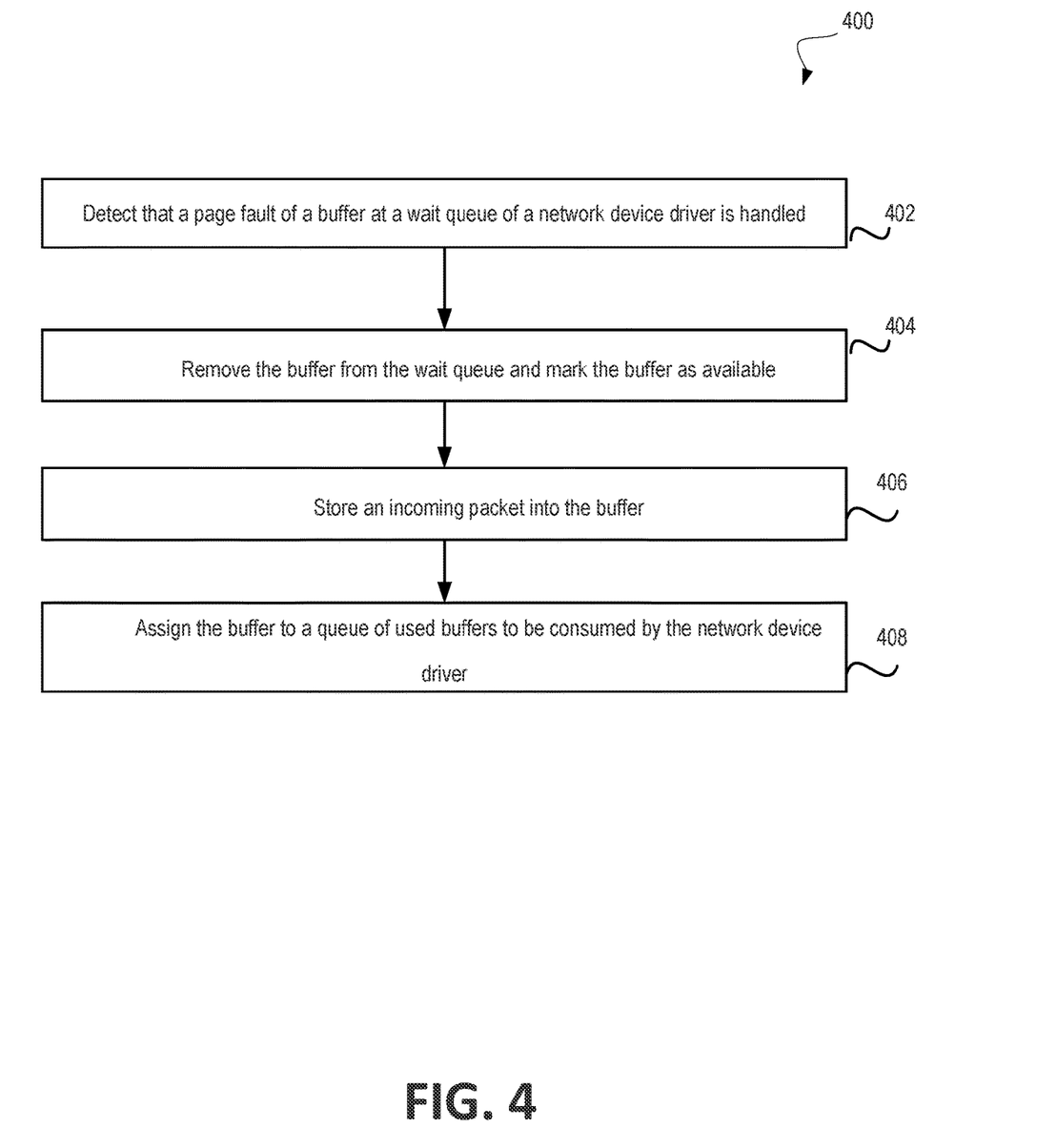
FIG. 4 is a flow diagram of an example method of using a memory buffer of a network device after a page fault of the memory buffer is handled, in accordance with one or more aspects of the present disclosure.

FIG. 4 is a flow diagram of an example method of using a memory buffer of a network interface device after a page fault of the memory buffer is handled, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., host computer system 100 of FIG. 1) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Method 400 may begin at block 402. At block 402, the processing logic may detect that a page fault of a memory buffer of a network interface device driver is handled. Alternatively, the processing logic may detect that a page fault of a memory buffer of a network interface device is handled, a page fault of a memory buffer of a hypervisor is handled, and/or a page fault of a memory buffer of guest operating system is handled. In an implementation, the memory buffer may be assigned to a wait queue when the page fault occur. The processing logic may then monitor the memory buffer in the wait queue to detect when the page fault is handled, as described in more details herein.

At operation 404, the processing logic may remove the buffer from the wait queue and may further assign the buffer to a receiving queue of the network interface device driver, so that it may be used for storing incoming packets from the network. In implementations, the processing logic may further mark the buffer as available, as described in more details herein.

At operation 406, when an incoming packet arrives at the network interface device, the processing logic may store the incoming packet into the memory buffer. The processing logic may further mark the memory buffer as used. At operation 408, the processing logic may append the buffer at the end of a set of used memory buffers. In implementations, the set of used buffers may be part of a separate queue for storing used memory buffers that are ready to be consumed by the network interface device driver, as explained in more details herein.

Figure 5:
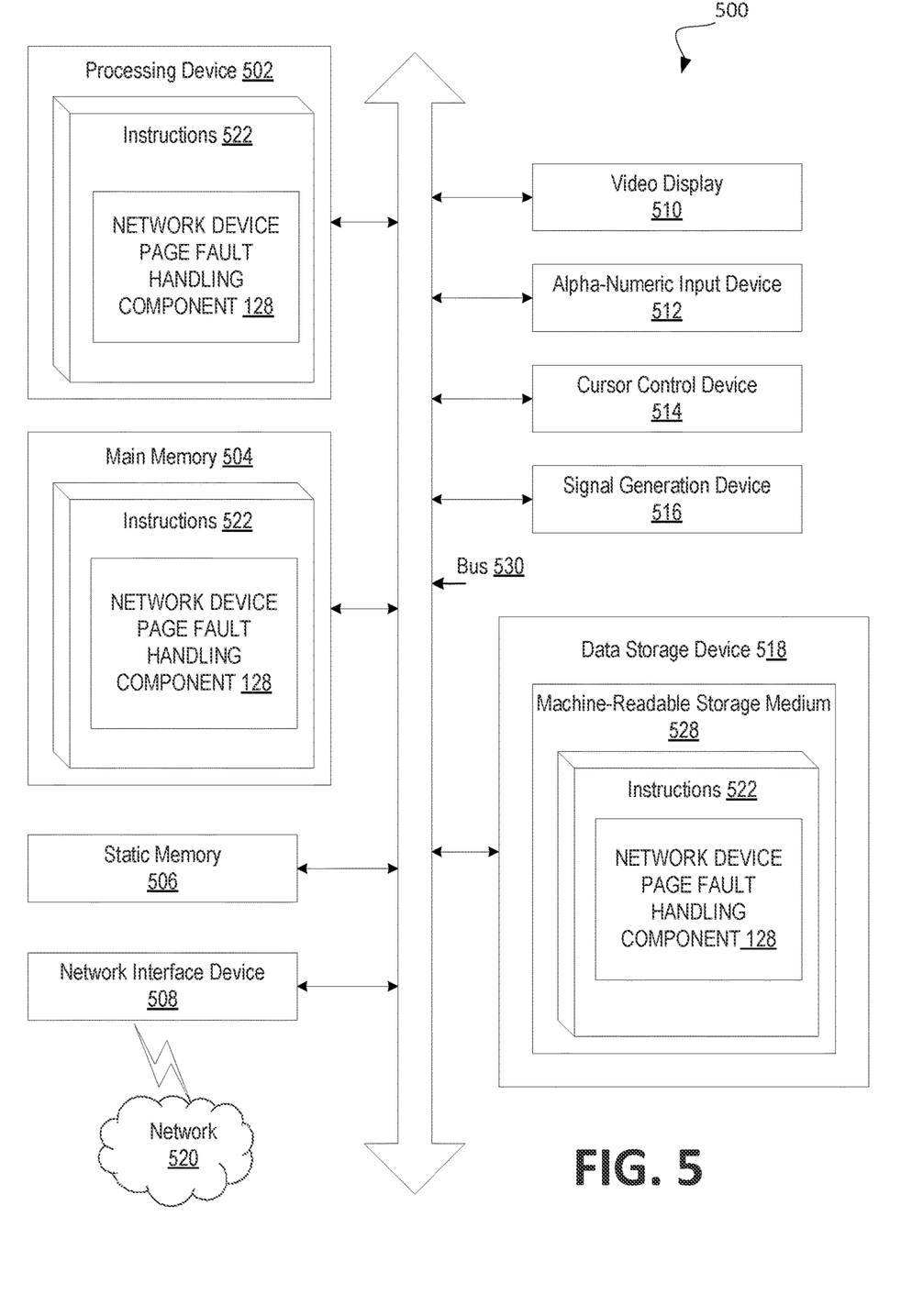
FIG. 5 depicts a block diagram of a computer system operating in accordance with one or more aspects of the disclosure.

FIG. 5 depicts a block diagram of a computer system operating in accordance with one or more aspects of the disclosure. In various illustrative examples, computer system 500 may correspond to a computing device 110 within system architecture 100 of FIG. 1. In one implementation, the computer system 500 may be the computer system 110 of FIG. 1. The computer system 500 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 518, which may communicate with each other, as well as with other components of the system via a bus 530.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 508. Computer system 500 also may include a video display unit 510 (e.g., an LCD), an alphanumeric input device 512 (e.g., a keyboard), a cursor control device 514 (e.g., a mouse), and a signal generation device 516.

Data storage device 518 may include a non-transitory computer-readable storage medium 528 on which may store instructions 522 embodying any one or more of the methodologies or functions described herein (e.g., page fault handling component 128). Instructions 522 may also reside, completely or partially, within volatile memory 504 and/or within processing device 502 during execution thereof by computer system 500, hence, volatile memory 504 and processing device 502 may also constitute machine-readable storage media.

While computer-readable storage medium 528 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, and 400, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   receiving, by a network interface device of a host computer system, an incoming packet from a network;
   selecting, by the network interface device, a first buffer from a plurality of buffers associated with a receiving queue of the network interface device;
   attempting, by the network interface device, to store the incoming packet at the first buffer of the plurality of buffers; and
   responsive to detecting an error while attempting to store the incoming packet at the first buffer, storing, by the network interface device, the incoming packet at a second buffer of the plurality of buffers associated with the receiving queue, wherein the error is represented by a page fault generated responsive to a memory page of the first buffer being not present in a physical memory of the host computer system.

2. The method of claim 1, wherein the plurality of buffers are allocated by a driver of the network interface device.

3. The method of claim 1, wherein the plurality of buffers are allocated by the network interface device in a memory residing in the network interface device.

4. The method of claim 1, wherein the plurality of buffers are allocated by a hypervisor running on the host computer system.

5. The method of claim 1, wherein the plurality of buffers are allocated by a guest operating system of a virtual machine (VM) running on the host computer system.

6. The method of claim 1, further comprising:
   responsive to handling of the page fault having been completed, detecting that the memory page of the first buffer is present.

7. The method of claim 1, further comprising:
   responsive to detecting that the page fault is handled:
   storing a second incoming packet at the first buffer; and
   assigning the first buffer to the receiving queue.

8. The method of claim 1, wherein responsive to storing the incoming packet at the second buffer, marking the second buffer as used.

9. The method of claim 8, wherein responsive to detecting that the incoming packet at the second buffer has been read by the network interface device, marking the second buffer as available.

10. A system comprising:
    a memory;
    a processing device operatively coupled to the memory, the processing device to:
    receive, by a network interface device of a host computer system, an incoming packet from a network;
    select, by the network interface device, a first buffer from a plurality of buffers associated with a receiving queue of the network interface device;
    attempt, by the network interface device, to store the incoming packet at the first buffer of the plurality of buffers; and
    responsive to detecting an error while attempting to store the incoming packet at the first buffer, store, by the network interface device, the incoming packet at a second buffer of the plurality of buffers associated with the receiving queue, wherein the error is represented by a page fault generated responsive to a memory page of the first buffer being not present in a physical memory of the host computer system.

11. The system of claim 10, wherein the plurality of buffers are allocated by a driver of the network interface device.

12. The system of claim 10, wherein the plurality of buffers are allocated by the network interface device in a memory residing in the network interface device.

13. The system of claim 10, wherein the plurality of buffers are allocated by a hypervisor running on the host computer system.

14. The system of claim 10, wherein the plurality of buffers are allocated by a guest operating system of a virtual machine (VM) running on the host computer system.

15. A non-transitory computer-readable media storing instructions that, when executed, cause a processing device to:

receive, by a network interface device of a host computer system, an incoming packet from a network;

select, by the network interface device, a first buffer from a plurality of buffers associated with a receiving queue of the network interface device;

attempt, by the network interface device, by a network interface device to store the incoming packet at the first buffer of the plurality of buffers; and responsive to detecting an error while attempting to store the incoming packet at the first buffer, store, by the network interface device, the incoming packet at a second buffer of the plurality of buffers associated with the receiving queue, wherein the error is represented by a page fault generated responsive to a memory page of the first buffer being not present in a physical memory of the host computer system.

16. The non-transitory computer-readable media of claim 15, wherein the plurality of buffers are allocated by one of: a driver of the network interface device, the network interface device in a memory residing in the network interface device, a hypervisor running on the host computer system, or a guest operating system of a virtual machine (VM) running on the host computer system.

17. The non-transitory computer-readable media of claim 15, wherein the processing device is further to:

responsive to detecting that the page fault is handled:
 store a second incoming packet at the first buffer; and
 assign the first buffer to the receiving queue.

* * * * *